United States Patent [19]

Clarke et al.

[11] 4,003,816
[45] Jan. 18, 1977

[54] SULFURLESS ELECTROLYTIC CONCENTRATION OF AQUEOUS SULFURIC ACID SOLUTIONS

[75] Inventors: E. Colin W. Clarke; Jeffrey F. Gilbert; David N. Glew, all of Sarnia, Canada

[73] Assignee: The Dow Chemical Company, Midland, Mich.

[22] Filed: June 3, 1975

[21] Appl. No.: 583,375

Related U.S. Application Data

[62] Division of Ser. No. 517,345, Oct. 23, 1974, Pat. No. 3,915,821.

[52] U.S. Cl. .............................. 204/237; 204/275
[51] Int. Cl.² .................. C25B 1/02; C25B 1/04
[58] Field of Search ........... 204/130, 149, 275, 237

[56] References Cited

UNITED STATES PATENTS

| | | | |
|---|---|---|---|
| 2,793,182 | 5/1957 | Visnapuu | 204/130 |
| 3,616,337 | 10/1971 | Mather | 204/130 |

FOREIGN PATENTS OR APPLICATIONS

| | | | |
|---|---|---|---|
| 1,137,236 | 9/1961 | Germany | 204/130 |

*Primary Examiner*—T. M. Tufariello
*Attorney, Agent, or Firm*—Bruce M. Kanuch; Daniel L. DeJoseph

[57] ABSTRACT

An improved method for reducing the content of water in aqueous sulfuric acid solutions by electrolysis is provided wherein a sufficient amount of a chlorine containing oxidizing agent is provided in the solution in the vicinity of the cathode to prevent the build-up of sulfur deposits thereon. In an integrated system, drying of a wet fluid stream on a continuous basis is effected by contacting it with concentrated sulfuric acid and purifying and recycling the sulfuric acid by the method of this invention, only a small inventory of the sulfuric acid being required.

2 Claims, 3 Drawing Figures

SULFURLESS ELECTROLYTIC CONCENTRATION OF AQUEOUS SULFURIC ACID SOLUTIONS

CROSS-REFERENCE TO RELATED APPLICATION

This is a division of application Ser. No. 517,345, filed Oct. 23, 1974 now U.S. Pat. No. 3,915,821.

BACKGROUND OF THE INVENTION

The invention relates broadly to reducing the water content of an aqueous sulfuric acid solution. More specifically, the invention relates to the regeneration of aqueous sulfuric acid of any desired concentration by means of electrolysis.

The problem of satisfactorily, efficiently and economically removing water from aqueous sulfuric acid containing less than about 50 per cent by weight water has been a long standing enigma. Evaporation of the water by distillation requires the use of high temperatures at which the hot concentrated acid is highly corrosive and is difficult to contain.

Moreover, previous attempts to concentrate aqueous sulfuric acid by electrolysis invariably have demonstrated that in addition to the production of hydrogen gas and oxygen gas thereby decomposing and removing water from the acid, cathodic reduction of the acid itself occurs forming solid elemental sulfur which deposits on the cathode and disperses into the acid. Such sulfuric acid, contaminated with solid sulfur, is generally unsuitable for use in industrial applications. This has made the electrolytic method appear to be unsatisfactory for providing high concentrations of sulfuric acid on a commercial basis.

SUMMARY OF THE INVENTION

The content of water in an aqueous sulfuric acid solution is reduced by electrolysis in which a sufficient amount of a chlorine containing oxidizing agent is provided in the vicinity of the cathode to control, preferably to prevent, the build-up of sulfur deposits thereon. The oxidizing agent is one which is capable of oxidizing the electrolytic reduction products formed at the cathode so as to prevent the build-up of elemental sulfur thereon; representative materials include $Cl^-$, $ClO^-$, perchloric acid, and certain chlorate and perchlorate salts. An integrated fluid drying process comprises contacting a region wherein a $H_2SO_4$ solution removes water from the fluid and an electrolysis cell in which that water is removed from the $H_2SO_4$ solution by electrolysis.

DESCRIPTION OF THE INVENTION

The operation of a basic embodiment of the present invention will be better understood upon becoming familiar with the following description, reference being had to the accompanying drawings.

Figure 1:
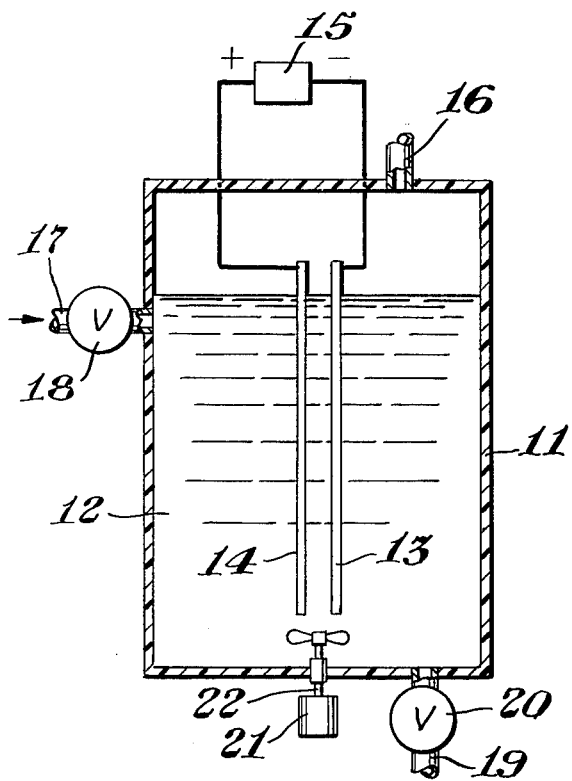
FIG. 1 is a view in vertical section of one embodiment of apparatus used according to the method of the present invention wherein the chlorine containing oxidizing agent is supplied in solid or liquid form.

Referring now to FIG. 1, a container 11 is shown partially filled with aqueous sulfuric acid solution 12 which serves as an electrolyte in which a cathode 13 and an anode 14 are partly immersed. A power source 15 provides direct current electricity to the anode 14 and the cathode 13. Hydrogen is generated at the cathode 13 and oxygen is generated at the anode 14. The mixture of gases is removed through a port 16 in the upper wall of container 11. The aqueous $H_2SO_4$ to be concentrated is conducted into the container 11 by a pipe 17 extending through the sidewall of the container 11 and which is fitted with an inlet valve 18. When the desired acid concentration is attained, the acid is removed from the container 11 via the pipe 19 which communicates with the floor of the container and which is fitted with an outlet valve 20. A mixing device 21, such as a motor driven propeller, the shaft 22 of which extends through a wall in the container 11 and into the acid, may be provided to increase electrolyte circulation.

In the operation of this embodiment, the chlorine containing oxidizing agent is supplied in non-gaseous form, e.g., as an acid or a salt. Provision of an adequate degree of mixing ensures that these oxidizing agents will be conveyed in sufficient quantity into the vicinity of the cathode so as to oxidize the cathodic reduction products either already present or as they form.

Figure 2:
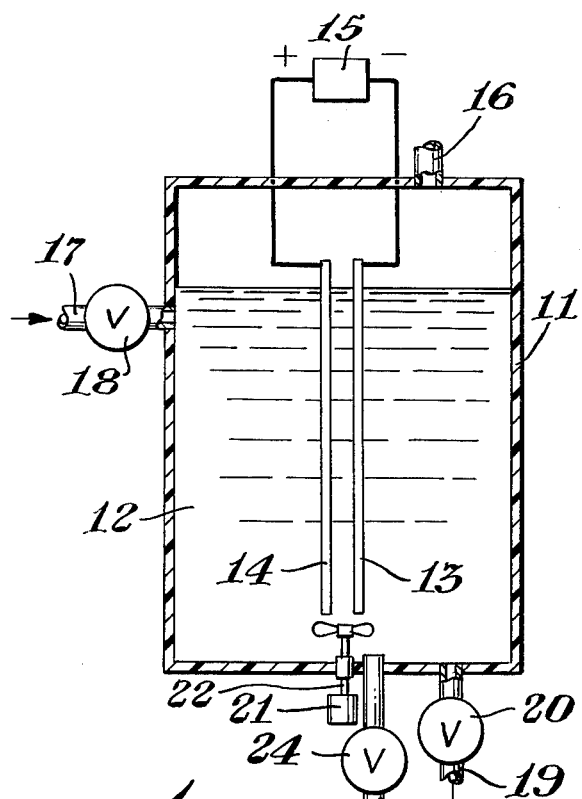
FIG. 2 is a view in vertical section of an embodiment of apparatus used according to the method of the present invention wherein the chlorine containing oxidizing agent is supplied in gaseous form.

An alternative embodiment of the present invention is depicted in FIG. 2, wherein a gaseous chlorine containing oxidizing agent is used. The apparatus remains unchanged except for the additional provision of a gas entry pipe 23 and a gas entry valve 24.

In the operation of this embodiment, the gaseous chlorine containing oxidizing agent is supplied through pipe 23 and valve 24 to bubble over the cathode at a rate sufficient to prevent the build-up of elemental sulfur on the cathode. Excess oxidizing agent leaves the reaction vessel through outlet port 16 in the upper wall of the vessel.

Gaseous substances are preferred as the chlorine containing oxidizing agents because it is believed they remain neutrally charged in the solution, permitting them closer access to the negatively charged cathode.

When the method of the present invention is utilized, a slight threshold film of sulfur is sometimes found to form on the cathode. The density of the electrolytic current relative to the surface area of the electrodes has been found to influence the magnitude of this threshold sulfur film; at anodic current densities on the order of about 0.5 amp/sq. in. (0.078 amp/cm$^2$), this amount may be 0.0001 gm. sulfur/sq. in. (0.000016 gm/cm$^2$) of cathode surface area. At higher current densities, e.g., 4 amps/sq. in. (0.62 amp/cm$^2$), this film is virtually undetectable, i.e., less than about 0.0001 gm/sq. in.

After formation of this slight initial film, however, any further increase in the amount of sulfur on the cathode is prevented by the practice of the present invention. The term build-up is used in this application to denote the further increase in the amount of sulfur on the cathode, which increase may be controlled according to the present method to limit it to zero or any other predetermined rate less than that which would occur absent the practice of the present invention. As an example of the build-up of sulfur occurring absent the practice of the present invention, an electrolysis was conducted on an 83.5 per cent by weight $H_2SO_4$ solution with an anodic current density of 0.15 amp/sq. in.; sulfur built-up on the cathode at the rate of about 0.05 gm. sulfur/gm. $H_2O$ removed from the acid solution (Comparison 4).

The $H_2SO_4$ reduction products formed include sulfite ions, elemental sulfur, and intermediates such as thionate ions, thiosulfate ions, hyposulfite ions, polysulfide ions, and the like. It is believed that the chlorine containing oxidizing agent actually oxidizes certain of the above intermediate cathodic reduction products before they are reduced to sulfur. To this end any chlorine containing oxidizing agent which (1) oxidizes any or all of the cathodic reduction products so as to preclude the build-up of sulfur on the cathode and (2) does not deleteriously contaminate or react with the electrolyte, is usable in the method of the present invention.

As indicated above, the chlorine containing oxidizing agent may be supplied in the form of a gas or in the form of a salt or an acid. Examples of usable gaseous oxidizing agents include $Cl_2$ and $ClO_2$. The latter should be diluted, e.g., with $O_2$, to limit its partial pressure to not greater than about 44 mm. (based on a total gas stream pressure of 760 mm.) to preclude formation of an explosive mixture. An example of a usable acid is perchloric acid. Examples of usable salts are the various chlorates and perchlorates, e.g., those of Na, K or Ca. Ammonium salts are to be avoided because the $NH_4^+$ ion is likely to react with other compounds in the solution to form undesirable contaminants.

In preventing the build-up of any noticeable amount of sulfur deposit on the cathode, the chlorine containing oxidizing agent may be supplied continuously or intermittently, so long as there is at all times a sufficient amount of the oxidizing agent in contact with the cathode to reoxidize the reduction products of $H_2SO_4$ which are formed at the cathode. In some situations temporary build-up of sulfur deposits on the cathode may be tolerable, in which event the oxidizing agent need be supplied to the cathode in sufficient amounts to reoxidize the $H_2SO_4$ reduction products only at the point when the sulfur deposits must finally be removed.

The rate at which the chlorine containing oxidizing agent comes into contact with the cathode is a function of its rate of supply, its solubility in the solution, and the amount of mixing provided. In practice, adequate mixing is first assured, and then the chlorine containing oxidizing agent is added to the solution at whatever rate is required to contain the build-up of sulfur. When, for example, $Cl_2$ is employed, it is generally bubbled into the solution in amounts of a few cc. per hour. For example, in carrying out the present method in the apparatus of the type shown in FIG. 2 with a concentration of the initial aqueous sulfuric acid electrolyte of 78.4 per cent, and a current flow of 0.88 ampere and current density 0.22 amp/sq. in. (0.034 cm²), a chlorine flow of 6 cm³/hour prevented the build-up of sulfur throughout a period of 23.5 hours in which the sulfuric acid was concentrated to 99.7 per cent $H_2SO_4$; see Example 4 in the accompanying Table. The optimum rate of supply will of course depend on such factors as temperature, size of cell and rate of electrolysis.

The electrolyte used herein is the aqueous sulfuric acid solution to be purified, from which all or a portion of the water present is to be removed. Aqueous sulfuric acid solutions of any concentration may be further concentrated by the method of the present invention. However, acid of initial concentration in the range from about 50 to about 100 weight per cent sulfuric acid in aqueous sulfuric acid is the most likely composition to be concentrated by this method, since it is in this range that other methods of concentration, such as boiling or conventional electrolysis, encounter substantial difficulties avoided by the use of the present method. As a practical matter the industrially found solutions more generally contain $H_2SO_4$ in the range of about 50 to about 90 per cent by weight.

The aqueous sulfuric acid may be electrolyzed to 100 weight per cent $H_2SO_4$ or higher by practicing the method of the invention. Alternatively, the acid may be withdrawn from the electrolytic cell at any desired concentration between the initial value and 100 per cent.

The electrolytic cell or container may be made of any material that does not adversely react with the electrolyte under conditions encountered in the electrolysis, e.g., the presence of a strong oxidizing agent, electric current flow, and elevated temperature. By adverse reaction is meant the formation of unacceptable contaminants or corrosion of the container walls at a rate sufficient to make the use of such materials impractical. Representative, though not exhaustive of the usable materials are glass, ceramics, teflon, and platinum, or other materials of construction having a protective coating formed of one of these acid resistant materials.

The electrodes are likewise in contact with this strongly oxidizing medium. Though many materials are usable, those exhibiting high corrosion resistance are preferred so as to maintain as pure an electrolyte as possible and to avoid the need to replace electrodes. To this end, platinum is the preferred electrode material.

In the practice of the present electrolytic method, corrosive degradation of a platinum anode is found to be very slow and to involve the substantial redeposition, i.e., about 90 per cent, of the platinum lost from the anode onto the cathode. Accordingly, the flow of electrolytic current may be reversed periodically to permit the platinum anode to regain approximately 81 per cent of its platinum loss during the electrolysis of the sulfuric acid solution.

The electrolyte may be maintained at any temperature above its freezing point. Higher temperatures are advantageous in that the cathode reduction products are oxidized faster and the electrolyte conductivity increases with temperature, reducing the ohmic resistance encountered in the electrolysis. However, higher temperatures are disadvantageous in that the chlorine containing oxidation agents tend to decompose or be consumed more rapidly at higher temperatures, and also corrosivity and resulting materials of construction problems are increased. Presently, operating temperatures from about 10° C to about 80° C are preferred, although use of higher temperatures may become feasible if appropriate materials of construction are developed.

Mixing of the electrolyte is useful in assuring that the chlorine containing oxidizing agent is brought into contact with the cathode. Although the evolution of bubbles of hydrogen and oxygen gas during the electrolysis effects substantial mixing of the electrolyte, it may be desirable to provide additional mixing, e.g., by means of a stirrer, e.g., as indicated by mixing element 21 of FIG. 1. Also, use of a gaseous source such as $Cl_2$ is useful in that the stream of bubbles contributes to the mixing of the solution. Mechanical mixing so vigorous that cavitation and aeration of the electrolyte results is to be avoided due to the reduced electrical conductivity caused by excessive gas bubble formation and entrainment.

Though not essential to the invention, it may be found desirable to provide a liquid permeable membrane between the electrodes to separate hydrogen and oxygen as they are evolved, e.g., where they are to be utilized separately or where there exists a risk of ignition of the mixture of $H_2$ and $O_2$. A generally suitable membrane may be constructed, e.g., of a woven fiberglas net with open spaces approximately 0.5 mm. × 0.5 mm.

A particularly useful application of the present invention is in a closed system drying process for fluids containing water. The $H_2O$ content of the fluid is substantially removed by intimately contacting the fluid with concentrated sulfuric acid in cocurrent or countercurrent fashion as is well understood in the art. The $H_2O$ is absorbed by the sulfuric acid and the acid is then reconcentrated by subjecting the aqueous sulfuric acid to electrolysis according to the practice of this invention.

The fluid to be dried may be either a liquid or a gas and should not be subject to deleterious reaction with concentrated aqueous sulfuric acid and not be miscible with or soluble in the acid, so that it can be separated readily from the acid after contacting. Examples of fluids advantageously dried using the present integrated system include the halogens and hydrocarbon liquids and gases. The extent to which $H_2O$ must be removed from the $H_2SO_4$ solution depends on the nature of the fluid and the extent to which the $H_2O$ content therein is to be reduced.

The entire fluid drying process may be operated on continuously recycling one initial charge of sulfuric acid, with occasional small additions of make up acid.

When gaseous chlorine is the fluid to be dried, the method of the present invention is expeditiously applied in that a trickle of chlorine from either the input or output fluid stream may be diverted to the inlet to the cathode in the electrolytic cell, thus serving as the source of the chlorine containing oxidizing agent, obviating the need for adding any other compounds.

Figure 3:
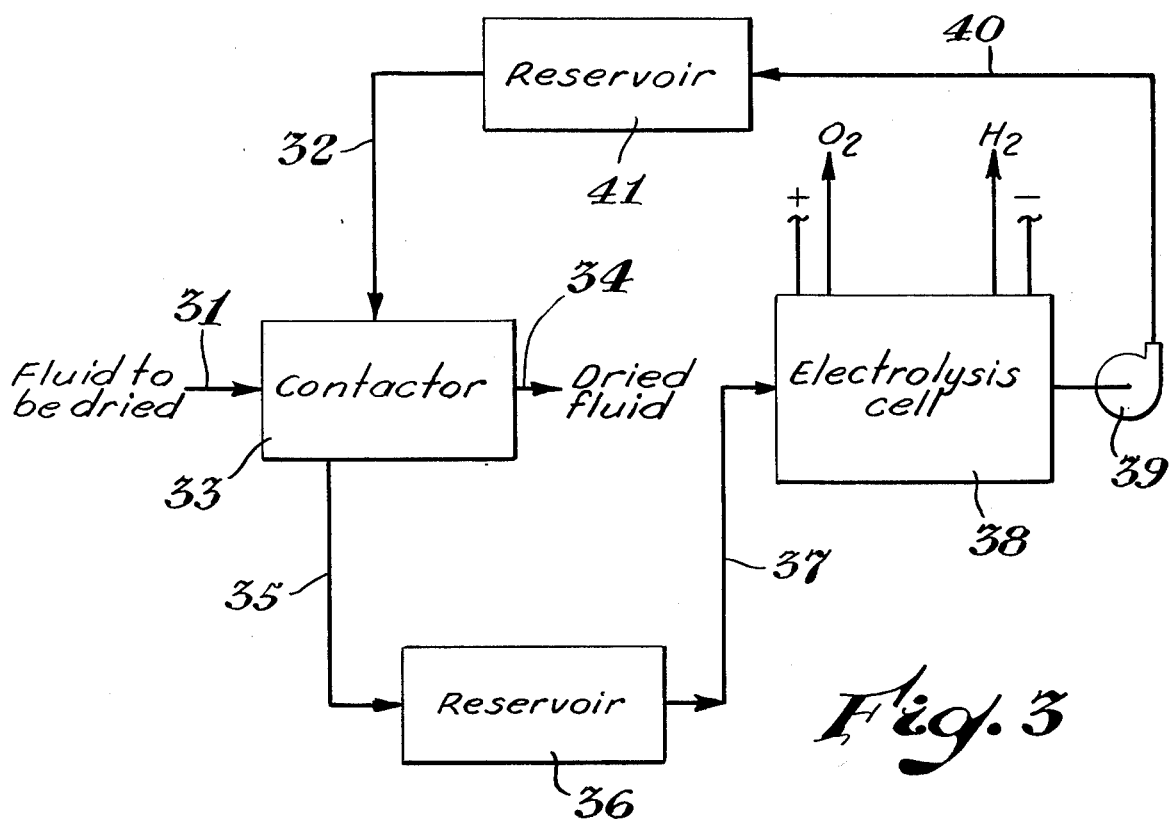
FIG. 3 is a schematic illustration of a system for drying sulfuric acid by electrolysis according to the present invention as an integral part of a fluid drying process.

FIG. 3 presents apparatus for the integrated fluid drying process in schematic form. Referring to the drawing in FIG. 3, the wet fluid stream 31 to be dried is contacted with concentrated sulfuric acid furnished by supply stream 32 in contacting device 33, wherein the fluid gives up a substantial part of its $H_2O$ content to the concentrated sulfuric acid. The fluid stream leaves the contacting device 33 as exit stream 34 substantially reduced in $H_2O$ content. The sulfuric acid which has absorbed $H_2O$ in the contacting device leaves the contacting device as exit stream 35 which is conducted into dilute acid reservoir 36. Periodically the dilute acid content in reservoir 36 is emptied by a feed stream 37 into an electrolytic cell 38. This cell is provided with an oxidizing agent according to any of the practices or modifications of the present invention and an electric current is supplied to effect electrolysis which removes water from the aqueous acid without elemental sulfur formation or build-up.

Periodically, after the electrolysis has proceeded to the point that the acid in the cell has been concentrated to the desired percentage of $H_2SO_4$, electrolysis is suspended and the acid content of the electrolytic cell is removed by a pump 39 and is conducted as stream 40 to a concentrated acid reservoir 41. The content of this reservoir is fed continuously as a supply stream 32 back to the contacting device 33 to be brought into contact with the fluid stream 31 to be dried.

EXAMPLE

In the following nine test runs, aqueous sulfuric acid solutions were concentrated by electrolysis. In Comparisons 1, 2, 3 and 4 the present method was not practiced but in Examples 1, 2, 3, 4 and 5 the electrolysis was conducted according to the present method utilizing the apparatus illustrated in FIG. 1. The electrolytic cell was constructed of borosilicate glass. Various metals were used as the electrodes, as indicated in the accompanying Table. The electrodes had a surface area of 4.0 sq. in. (25.8 cm²) and were placed 1.0 in. (2.54 cm) apart. The temperature of the electrolyte was approximately 25° C in each test. The parameters and results are presented in the Table and show that even a low rate of $Cl_2$ supply to the cathode eliminates sulfur formation, as in Examples 1, 2, 3 and 4. In contrast, when no chlorine was added, as in corresponding Comparisons 1, 2, 3 and 4, the electrolysis produced solid sulfur which deposited on the cathode. In Example 5, no $Cl_2$ was sparged in for the first 4.0 hours of electrolysis, during which period the invention was not practiced and sulfur formation occurred. Chlorine sparging was thereupon begun according to the invention and continued for the balance of the electrolysis period. Not only was further sulfur formation prohibited, but also that sulfur previously formed was reoxidized to yield a sulfur-free solution.

TABLE

| | Effect of Chlorine Addition at Room Temperature | | | | | | | | | | |
|---|---|---|---|---|---|---|---|---|---|---|---|
| Run No. | Initial Conc. of Sulfuric Acid (wt. %) | Initial Wt. of Sulfuric Acid (gm) | Chlorine Flow Rate (cm³/hr) | Duration of Electrolysis (hr) | Mean Anodic Current Density (amps/ sq. in) | (amps/ cm²) | Electrode Material Anode | Cathode | Water Removed (gm) | Final Conc. of Sulfuric Acid (wt. %) | Sulfur Formed (gm) |
| Example 1 | 60.6 | 27.5 | 20 | 78.5 | 0.11 | 0.017 | Pt | Pt | 8.9 | 91.3 | 0.00 |
| Comparison 1 | 60.6 | 27.8 | 0 | 78.5 | 0.10 | 0.016 | Pt | Pt | 9.1 | 91.1 | 0.10 |
| Example 2 | 66.8 | 26.9 | 8 | 36.8 | 0.21 | 0.034 | Pt | Alloy A¹ | 8.1 | 95.6 | 0.00 |
| Comparison 2 | 66.8 | 27.4 | 0 | 37.0 | 0.20 | 0.032 | Pt | Alloy A | 7.9 | 94.2 | 0.15 |
| Example 3 | 83.5 | 27.4 | 10 | 20.5 | 0.09 | 0.015 | Ir | Alloy B² | 2.0 | 90.7 | 0.00 |
| | | | | | | Pt/10% | | | | | |
| Comparison 3 | 83.5 | 27.1 | 0 | 20.5 | 0.11 | 0.018 | Ir | Alloy B | 2.3 | 91.2 | 0.13 |
| | | | | | | Pt/10% | | | | | |
| Example 4 | 78.4 | 27.0 | 6 | 23.5 | 0.22 | 0.035 | Pt | Pt | 5.5 | 99.7 | 0.00 |
| Comparison 4 | 78.4 | 27.3 | 0 | 24.0 | 0.21 | 0.033 | Pt | Pt | 5.3 | 99.1 | 0.26 |
| Example 5 | 83.5 | 28.8 | 0 | 4.1 | 0.10 | 0.017 | Pt | Pt | 3.3 | 94.3 | 0.00 |

TABLE-continued

Effect of Chlorine Addition at Room Temperature

| Run No. | Initial Conc. of Sulfuric Acid (wt. %) | Initial Wt. of Sulfuric Acid (gm) | Chlorine Flow Rate (cm³/hr) | Duration of Electrolysis (hr) | Mean Anodic Current Density (amps/sq. in) | (amps/cm²) | Electrode Material Anode | Cathode | Water Removed (gm) | Final Conc. of Sulfuric Acid (wt. %) | Sulfur Formed (gm) |
|---|---|---|---|---|---|---|---|---|---|---|---|
| | | | 20 | 28.0 | | | | | | | |

[1]Alloy A: 14.5% Si, 0.9% C, 1% Mn, balance Fe
[2]Alloy B: 24% Ni, 20% Cr, 3% Mo, 3.25% Si, 0.5% Mn, 0.07% C, balance Fe

What is claimed is:

1. An apparatus for reducing the $H_2O$ content of a wet fluid comprising:
   a. means for contacting the wet fluid with a stream of sulfuric acid solution and thereafter to separate the wet sulfuric acid solution from the fluid,
   b. an electrolytic cell for subjecting the wet sulfuric acid solution to electrolysis to remove at least a substantial portion of the $H_2O$ removed from the wet fluid and containing, in contact with the cathode which is exposed to the wet sulfuric acid, a quantity of a chlorine containing oxidizing agent sufficient to control the build-up of sulfur deposits on said cathode during the electrolysis of said wet sulfuric acid, said electrolytic cell being equipped with platinum electrodes,
   c. a first liquid conduit means in communication with said contacting means and said electrolytic cell,
   d. a second liquid conduit means in communication with said electrolytic cell and said contacting means,
   e. a quantity of sulfuric acid solution contained in said elements (a), (b), (c) and (d) that is sufficient to remove at least a substantial portion of the $H_2O$ content of the fluid, said sulfuric acid having a concentration greater than about 50 per cent by weight $H_2SO_4$, and
   f. means for urging said sulfuric acid solution to circulate in a closed loop through said contacting means, said electrolytic cell, said first liquid conduit means, and said second liquid conduit means.

2. The apparatus of claim 1 further comprising:
   a. a first reservoir means interposed in said first conduit means adapted to continuously collect the sulfuric acid solution flowing from the contacting means and to convey at intervals an amount of said collected solution to the electrolytic cell, and
   b. a second reservoir means interposed in said second conduit means adapted to receive at intervals from the electrolytic cell the sulfuric acid solution which has been subjected to electrolysis and to provide a continuous flow of said solution to the contacting means.

* * * * *

UNITED STATES PATENT OFFICE
CERTIFICATE OF CORRECTION

PATENT NO. : 4,003,816
DATED : Jan. 18, 1977
INVENTOR(S) : E. Colin W. Clarke; Jeffrey F. Gilbert; David N. Glew It is certified that error appears in the above-identified patent and that said Letters Patent are hereby corrected as shown below:

Column 1, line 45, delete "$Cl^=$, $ClO^=$" and insert --$Cl_2$, $ClO_2$--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*